(12) United States Patent
Cutler

(10) Patent No.: US 7,063,427 B1
(45) Date of Patent: Jun. 20, 2006

(54) PORTABLE MIRROR DEVICE

(76) Inventor: Thomas Charles Cutler, 448 Camden Dr., Madison Heights, VA (US) 24572

( * ) Notice: Subject to any disclaimer, the term of this patent is extended or adjusted under 35 U.S.C. 154(b) by 148 days.

(21) Appl. No.: 10/361,453

(22) Filed: Feb. 10, 2003

(51) Int. Cl.
*G02B 7/182* (2006.01)

(52) U.S. Cl. .................. 359/879; 359/872; 359/879

(58) Field of Classification Search ............ 359/881; D28/64.2, 64.3; 2/DIG. 8
See application file for complete search history.

(56) References Cited

U.S. PATENT DOCUMENTS

| | | | | |
|---|---|---|---|---|
| 896,269 | A * | 8/1908 | Birdwell | 359/879 |
| 956,275 | A * | 4/1910 | Birdwell | 16/59 |
| 1,001,759 | A * | 8/1911 | Hoogner | 359/879 |
| 1,509,746 | A * | 9/1924 | Zeidler | 359/874 |
| 2,071,243 | A * | 2/1937 | Tripp | 359/880 |
| 2,117,403 | A * | 5/1938 | Crosby | 359/880 |
| 2,327,096 | A * | 8/1943 | Dann | 359/880 |
| D155,096 | S * | 9/1949 | MacWilliams | D28/64.2 |
| 3,717,403 | A * | 2/1973 | Messier | 359/879 |
| 4,054,375 | A * | 10/1977 | Ribeca | 359/842 |
| 4,257,680 | A * | 3/1981 | Baczkowski | 359/879 |
| D262,494 | S * | 12/1981 | Pokorny | D28/64.2 |
| 4,478,435 | A * | 10/1984 | Cheshier et al. | 285/39 |
| 4,487,479 | A | 12/1984 | Tolomeo, Sr. | |
| 4,490,012 | A | 12/1984 | Magiske | |
| 4,707,087 | A * | 11/1987 | Van Zandt | 359/880 |
| 4,750,811 | A | 6/1988 | Beyer | |
| 4,905,879 | A * | 3/1990 | Piccone | 224/173 |
| 5,106,177 | A | 4/1992 | Dolasia | |
| 5,361,169 | A * | 11/1994 | Deal | 359/838 |
| 5,383,061 | A | 1/1995 | Lanier | |
| 5,604,633 | A * | 2/1997 | Christianson | 359/507 |
| 6,030,085 | A * | 2/2000 | Leam et al. | 359/871 |
| 6,099,133 | A * | 8/2000 | Wright | 359/880 |
| 6,220,717 | B1 | 4/2001 | Pastore | |
| 6,476,984 | B1 * | 11/2002 | Ringdahl | 359/803 |
| 2004/0125477 | A1 * | 7/2004 | Carter et al. | 359/881 |

FOREIGN PATENT DOCUMENTS

| | | | |
|---|---|---|---|
| DE | 41 30 034 A1 * | 4/1993 | |
| JP | 09-164983 A * | 6/1997 | |
| WO | WO 86/01697 A1 * | 3/1986 | |

\* cited by examiner

*Primary Examiner*—Drew A. Dunn
*Assistant Examiner*—Mark Consilvio
(74) *Attorney, Agent, or Firm*—Denis O'Brien

(57) ABSTRACT

The present invention is a portable mirror device for hunters or other persons who need to extend their field of view to the side or rear without moving their head appreciably. The device is reversibly attached to a body-segment of the user and can either be raised to an active position or folded in a stored position against the body-segment. Also disclosed is an attachment-cuff for attaching the invention to the body-segment. The cuff comprises a rigid or semi-rigid inner member encased by a covering, which covering has two ends with closure means attached thereto for securing the cuff to the body-segment.

17 Claims, 5 Drawing Sheets

PORTABLE MIRROR DEVICE

BACKGROUND OF THE INVENTION

1. Field of the Invention

This invention relates to mirrors used by hunters and other persons who desire to expand their field of view.

2. Overview of the Prior Art

One technique commonly used in hunting is a passive approach; i.e. where the hunter remains in a fixed position waiting for prey to enter the range of fire. Deer hunters, turkey hunters, duck hunters, and even military snipers all frequently employ a passive approach, which entails certain skills not required when actively chasing or stalking prey. Foremost among the skills required for successful passive hunting is the ability to remain motionless, because game animals are very sensitive to motions occurring anywhere in their field of vision. Even the simple motion of a hunter turning his head to determine whether any prey are behind him can tip the prey off to the hunter's presence. Consequently, the act of turning to look behind oneself is often counter-productive because it scares away the very game that the hunter turned around to look for. For this reason hunters have employed mirrors in various forms to expand their field of view to the rear with a minimum of motion.

U.S. Pat. No. 4,750,811 to Beyer is an example. Beyer's device consists of a mirror attached to a telescoping pole connected to a base that can be set on the ground adjacent the hunter. The device also includes a hinged hood to reduce glare from the mirror.

U.S. Pat. No. 4,487,479 to Tolomeo, Sr., teaches a mirror with a strap, which is used to attach the mirror to a tree trunk—a useful device for hunters who use tree stands exclusively or always hunt next to trees.

U.S. Pat. No. 5,383,061 to Lanier also discloses and claims a hunters' mirror that is attached to a nearby tree. Lanier's device is essentially an automobile rearview mirror with a screw-type appendage by which the mirror can be screwed into the side of a tree and then easily adjusted by the hunter.

Pastore has been granted U.S. Pat. No. 6,220,717 for a mirror-clamp combination, which can be easily attached to a hunter's stand.

In addition to devices specifically designed to be used by hunters, there are a variety of mirror-devices designed for more general purposes that may nevertheless serve a hunter's purposes. For instance, Magiske has been granted U.S. Pat. No. 4,490,012 for a mirror that clips onto the brim of a cap, which has received widespread acceptance by bicyclists.

BRIEF SUMMARY OF THE INVENTION

1. SHORTCOMINGS OF PRIOR ART OVERCOME BY THE INVENTION

The type of prior art devices, such as those disclosed by Lanier and Tolomeo, Sr., that are attached to a fixed object such as a tree or other structure are limited to use in environments in which trees or other suitable attachment sites are found. Furthermore, in using such inventions, the user must maintain a constant angle between his body and the mirror or readjust the mirror each time his body moves with respect to the mirror. One would be hard pressed, for instance, to use the invention of Lanier while sitting in a rocking boat or duck blind.

Mirrors on stands, such as that proposed by Beyer, have the advantage of not requiring a tree however, they come with multiple other practical problems. For instance, if used in a rocking boat or unstable duck blind, the stand topples over easily and takes the mirror with it, possibly right out of the boat or blind. If used on solid land, such devices cause problems when the hunter has to act quickly in response to some exigency, such as when he wounds the prey and has to dash off in pursuit of it. In such situations the hunter must grab the mirror and carry it with him during the pursuit, or else risk losing the mirror by leaving it behind in thick ground-cover where it will be difficult to recover. In addition, like the inventions of Lanier and Tolomeo, Sr., Beyer's invention requires that the user maintain a constant position with respect to the mirror.

Mirrors of the type that can be attached to the hunter, such as the clips and clamps noted above have significant advantages over fixed devices because the angle between the user's eye and the mirror is more easily maintained, and the device stays with the hunter while he is attending to various tasks, such as running down wounded prey. But clamping or clipping mirrors onto hat brims, gun stocks, or clothing makes the mirror susceptible to being knocked off and broken, particularly while chasing wounded prey through a wooded area or while retrieving decoys over the gunnel of a bouncing boat.

2. OBJECTS OF THE INVENTION

The present invention overcomes the foregoing shortcomings of the prior art by attaining the following objectives.

A first object of the present invention is to provide a portable mirror device that can be effectively used without having to attach it to a tree, post, or other fixed object.

Another object of the present invention is to provide a portable mirror that does not have the disadvantage of unacceptable gravitational instability.

Another object of the present invention is to provide a portable mirror that attaches firmly to the user's person and therefore facilitates keeping a constant angle between the user's eye and the mirror.

Another object of the present invention is to provide a portable mirror that attaches firmly to the user's person so that it is not easily dislodged or overturned by movements of the user.

Another object of the present invention is to provide a portable mirror that folds out of the way when not in use.

3. IMPLEMENTATIONS OF THE INVENTION

The emphasis of the following disclosures is on hunting; however, upon considering the disclosures it will be obvious that there are many additional useful applications of the invention that enhance its utility. For instance, it can be used by snipers, by security guards, by police officers in a variety of ways such as on stake-outs, while directing traffic, or even while walking a beat. It can be used by operators of power boats who need to watch skiers being pulled behind the boat. In fact, this invention can be useful to any person who needs to extend their view—particularly to the rear—but who may need to move quickly in response to some exigency without the device getting in the way.

BRIEF DESCRIPTION OF THE SEVERAL VIEWS OF THE DRAWINGS

1. THE DRAWINGS.

Figure 1:
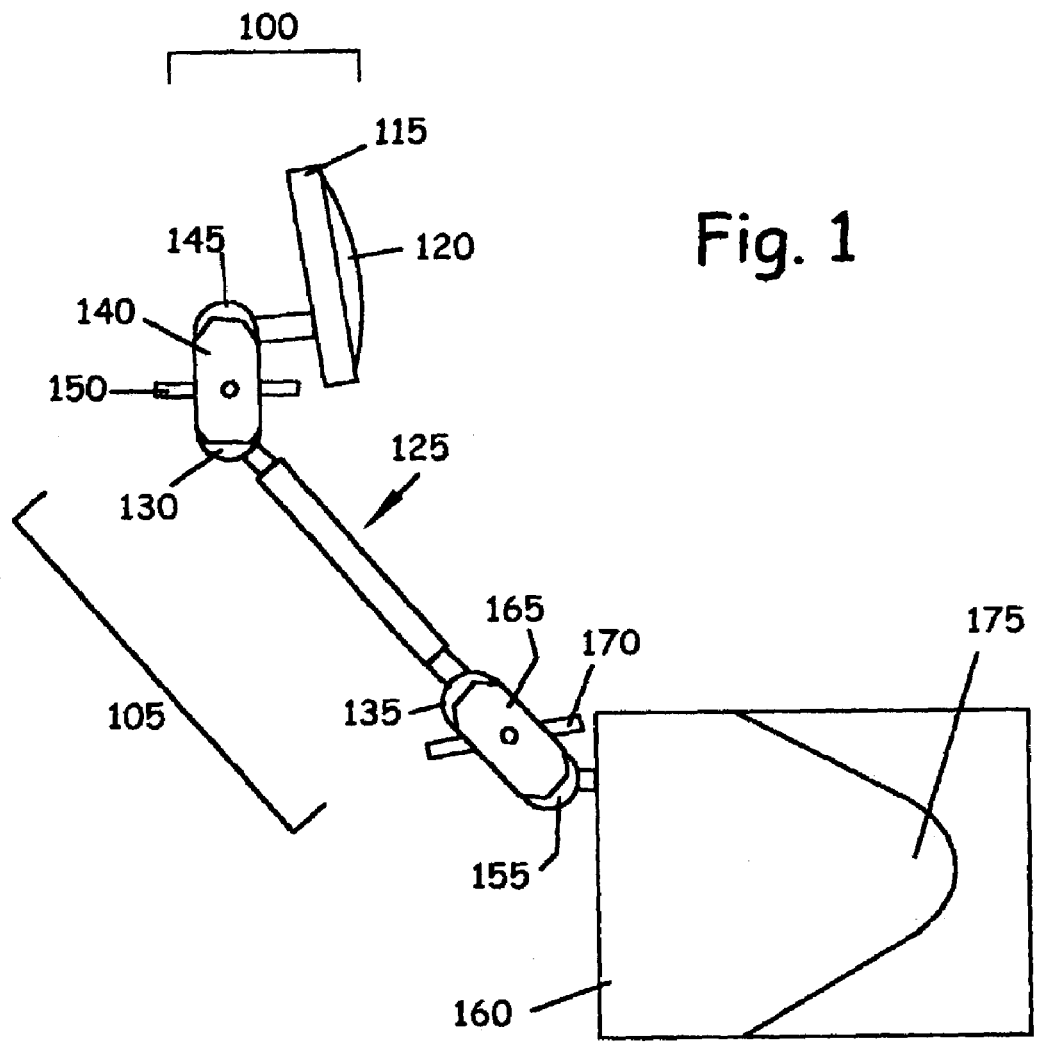

The objects, features and advantages of the invention will become apparent from the following DETAILED DESCRIPTION taken in connection with the accompanying drawings, in which:

FIG. 1. represents a side view of an embodiment of the invention employing compound ball-and-socket joints, as described below.

Figure 2:
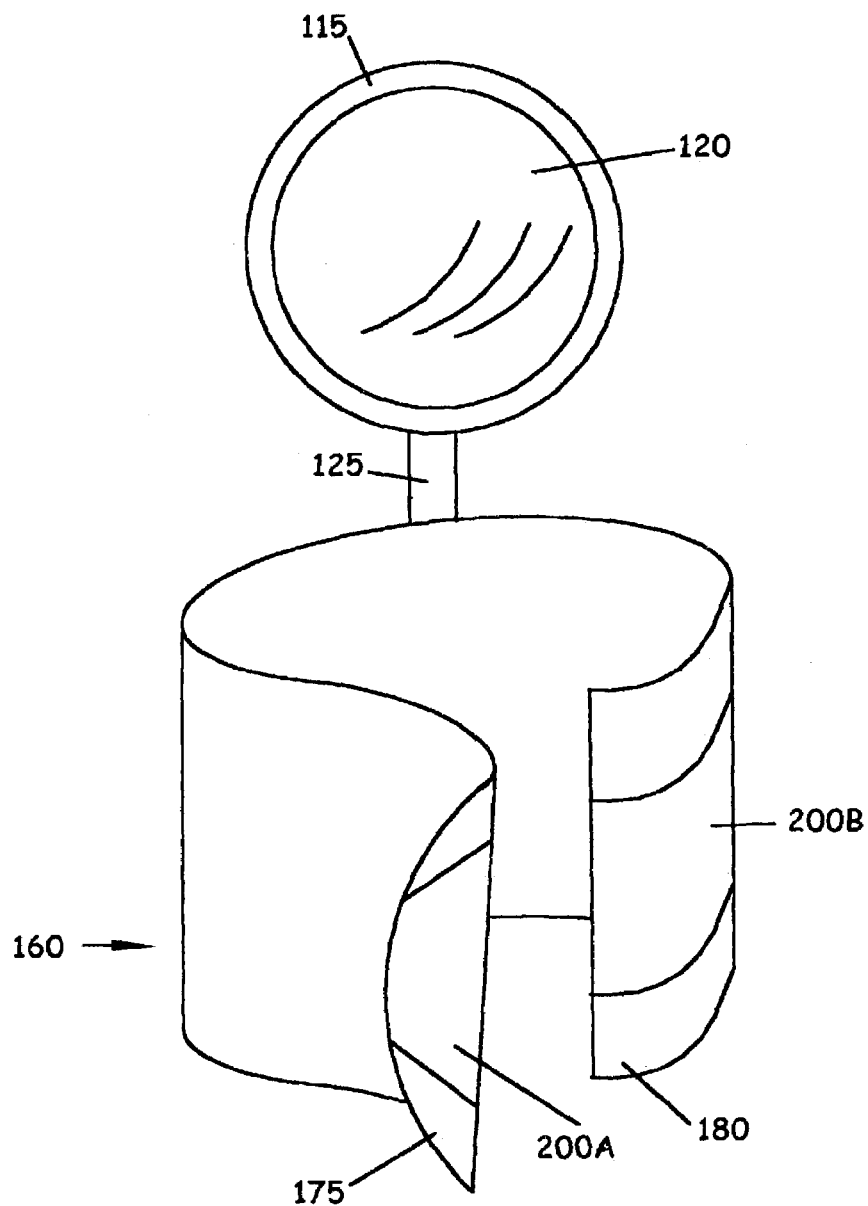

FIG. 2. represents a perspective view of the invention in which a cuff is employed as the attachment-device.

Figure 3:
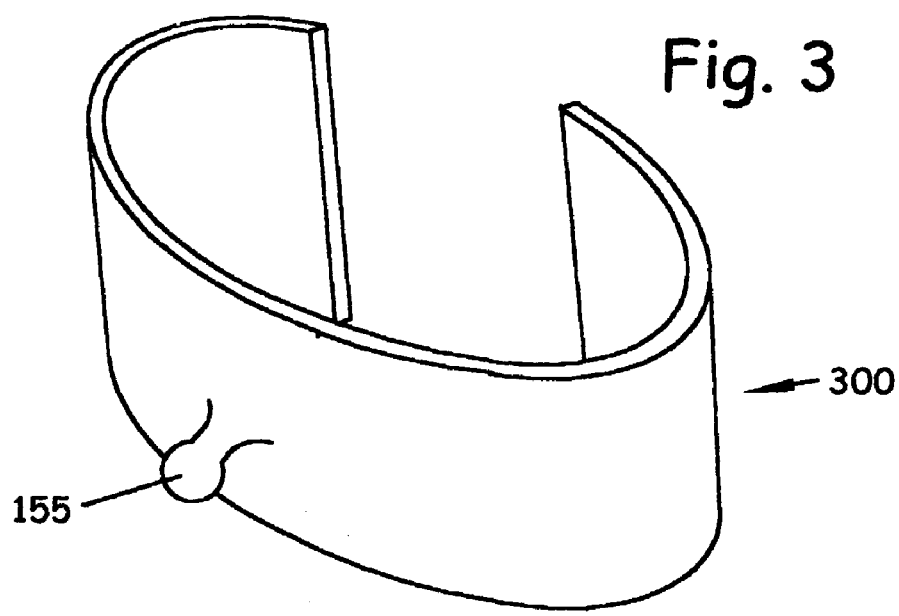

FIG. 3. is a perspective view of the inner member of the cuff shown in FIG. 2.

Figure 4:
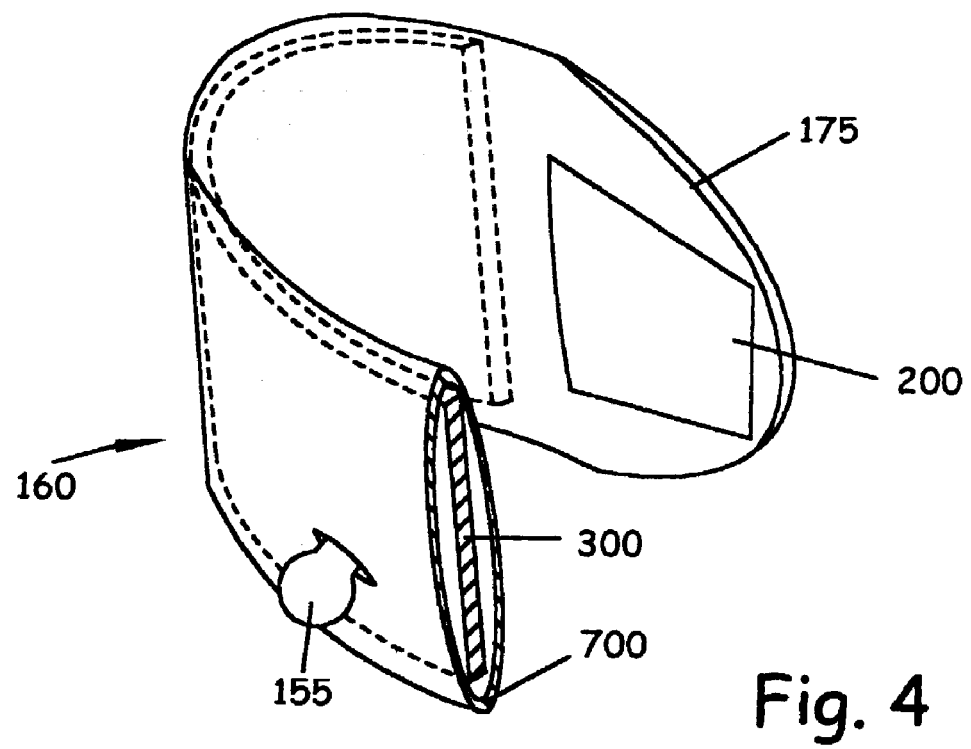

FIG. 4. represents a perspective view of the cuff shown in FIG. 2 that has been sectioned to show the relationship between the inner member and the cover.

Figure 5:
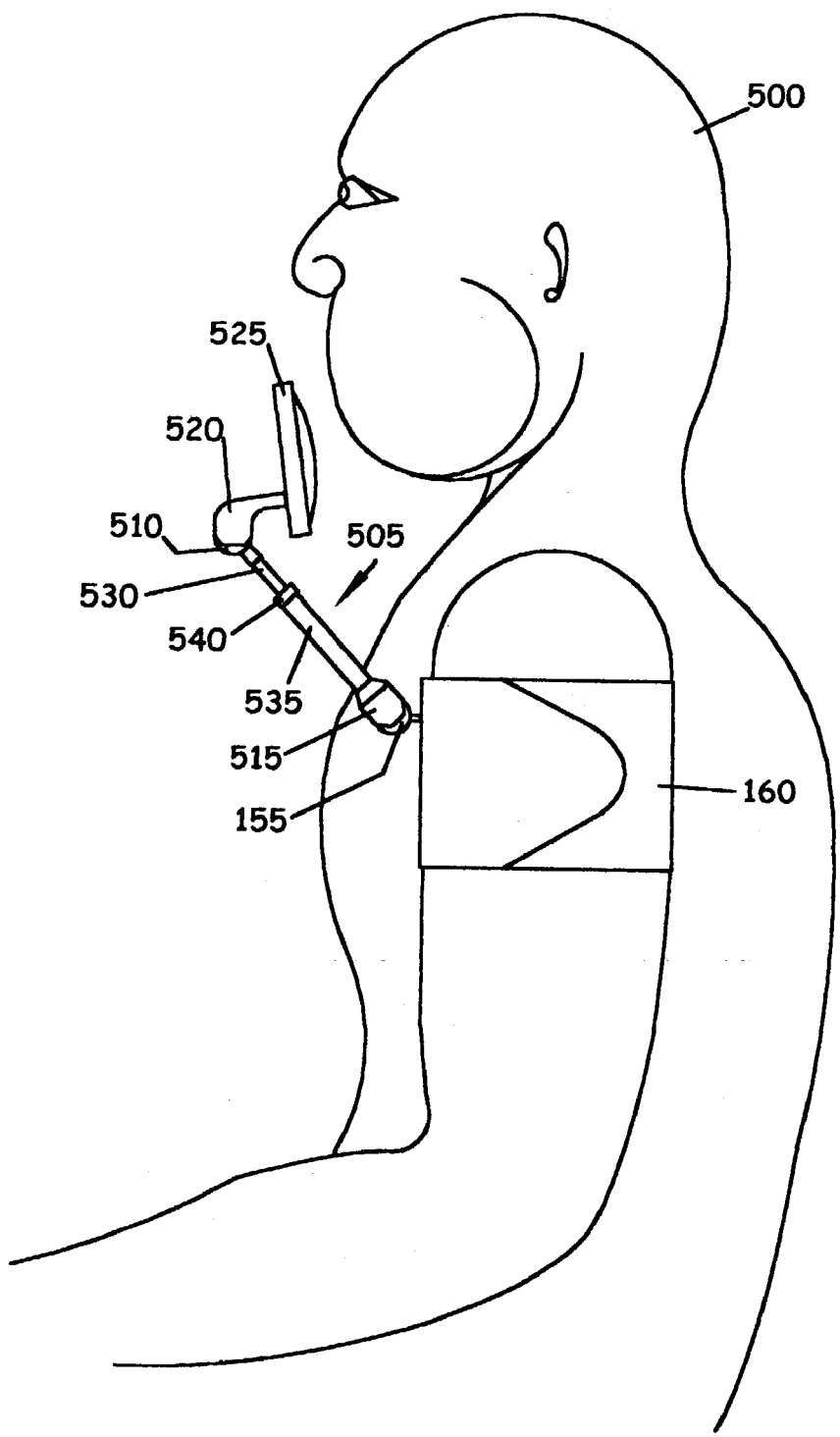

FIG. 5. is a side view of an embodiment of the invention employing simple ball-and-socket joints, as described below.

Figure 6:
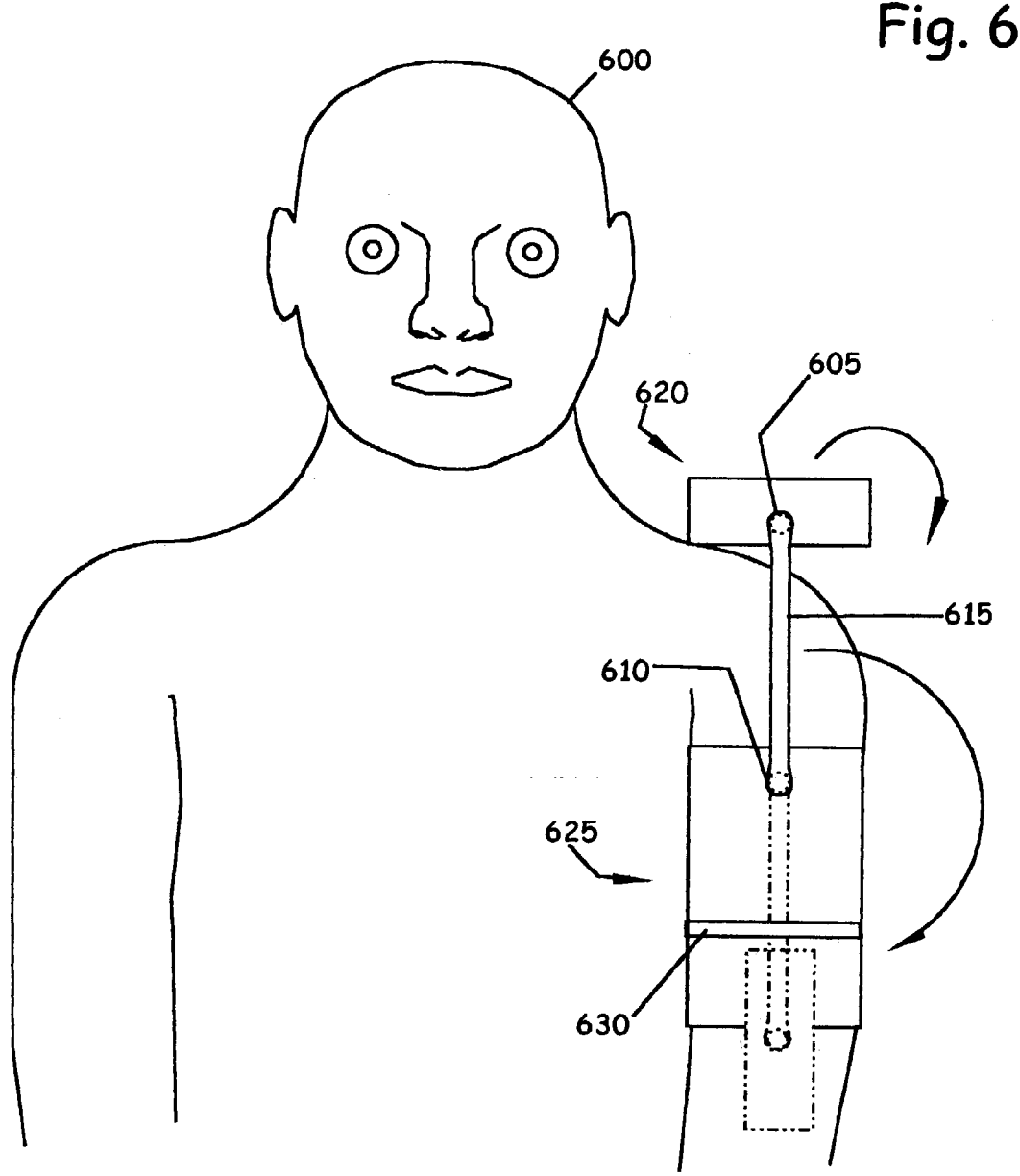

FIG. 6 is a front view of a user using the invention showing how the invention is converted from its active state to its stored state.

DETAILED DESCRIPTION OF THE INVENTION

1. DEFINITIONS OF TERMS

The following terms shall be understood as having the meanings set forth here:

Cuff: a substantially oblong band constructed of a flexible or semi-rigid material and having two ends such that the band can encircle a body-segment and be attached thereto by connecting the two ends.

Simple ball-and-socket joint: a mechanism for rotatably joining two members in which a ball depends from one member and frictionally engages a socket depending from the other.

Compound ball-and-socket joint: a mechanism employing at least two simple ball-and-socket joints in concert for rotatably joining two members.

Telescoping: the sliding motion of two or more concentric or overlapping elements of a structure relative to each other such that structure as a whole increases or decreases in length.

2. THE PREFERRED EMBODIMENTS OF THE INVENTION

A. OVERVIEW

The invention is a mirror device that is attached to a body-segment for extending the field of view of the user. Upon reading the disclosures made herein, it will be appreciated that there are a number of ways in which the invention can be used, and that the specific structure employed will be determined by the specific application. Consequently, there is no single best mode known for making and using the invention, but, rather, different embodiments are preferred for the specific applications to which they are best suited, as discussed herein.

The invention may be most easily comprehended as comprising five major components: 1) a mirror-assembly comprising at least one mirror, 2) a connecting member having an upper end and a lower end, 3) an attachment-device for reversibly attaching the invention to a user's body-segment, 4) an upper connection connecting the upper end of the connecting member to the mirror-assembly, and 5) a lower connection connecting the lower end of the connecting member to the attachment-device.

B. STRUCTURE OF THE INVENTION—FIRST PREFERRED EMBODIMENT.

FIG. 1 is a side-view of the invention illustrating the structural features of one preferred embodiment employing compound ball-and-socket joints.

Mirror-Assembly

Referring to FIG. 1, the mirror-assembly 100 of the first preferred embodiment comprises a mirror frame 115 that encases a mirror 120. The mirror frame is made of high-impact plastic and surrounds the mirror on all edges and its back to protect the mirror from scratches and breaking. The mirror may be made of glass or it may be silvered metal or other reflective material. Various types of glass and glass coatings are well known in the art that can be employed to minimize unwanted reflections. A variety of shapes of mirrors can be employed within the scope of the invention: round, rectangular, oval, for example. A convex mirror is preferred for many uses because it offers the advantage of increasing the field of view more than does a mirror with a flat surface, although both are within the scope of the invention. In addition, the mirror-assembly may comprise more than one mirror. For instance, combinations of flat and convex mirrors are well known. Given the disclosures made herein, it will be obvious to an artisan of ordinary skill how to make and use embodiments of the invention employing multiple mirrors.

The mirror frame of the first preferred embodiment also incorporates mirror-assembly ball 145 depending from the mirror frame for rotatably connecting the mirror-assembly to the upper end of connecting-member 105, as discussed in detail in the next section. The mirror-assembly ball is integrated into the mirror frame using techniques obvious to artisans of ordinary skill in the field.

Connecting-Member

Connecting-member 105 supports the mirror-assembly and connects the mirror-assembly to attachment-device 110. The connecting-member has an upper end in communication with the mirror-assembly and a lower end in communication with the attachment-device.

In the embodiment shown in FIG. 1, the connecting-member is a one-piece connecting-rod 125, the ends of which are rotatably connected to the mirror-assembly and attachment-device by means of a compound ball-and-socket joints, as described below. Telescoping rods and flexible arms of various types, such as gooseneck devices, may be used in place of the one-piece connecting-rod shown, depending on the application and needs of the user. Such telescoping rods and flexible arms are well known in the field and, given the disclosures made herein, the manner of making and using them in the present invention will be obvious to an artisan of ordinary skills in the field.

Connecting-rod 125 has two ball-ends. An upper ball-end 130 is used to form an upper adjustable articulation with the mirror assembly, and a lower ball-end 135 is used to form a lower adjustable articulation with the attachment-device 110. These adjustable articulations serve two purposes: 1) they permit alignment of the mirror in order to extend the users field of view in the desired direction, and 2) they permit the mirror to be folded against the user's body-segment when the mirror is not being used. These purposes are described more fully in the section titled "Operation of the Invention," below.

The adjustable articulation between the connecting-rod and the mirror-assembly is achieved by means of an upper compound ball-and-socket joint comprising a dual-socket connector 140, which grips the mirror-assembly ball 145 and the rod upper ball-end 130 simultaneously. Friction between the sockets and the balls can be adjusted by turning thumb screw 150.

A similar compound ball-and-socket joint is employed to form the adjustable articulation between the connecting-rod lower ball-end and the attachment-device 110. Attachment-device ball 155 depends from attachment cuff 160, as described below. Lower dual-socket connector 165 grips rod lower ball-end 135 and attachment-device ball 155 simultaneously. Friction between the ball-joint connector and the two balls can be adjusted by turning thumb screw 170.

The compound ball-and-socket joint connections employed in this first preferred embodiment are well known and the manner of making and using them in the present invention will be obvious to an artisan of ordinary skill in the field given the disclosures made herein.

Attachment-Device

Attachment-device 110 of FIG. 1 is employed to reversibly attach the invention to the user's body-segment. This attachment-device includes a cuff 160 having a first end 175 at one end that wraps around the user's body-segment and attaches to a second end of the cuff (not shown), as described in detail below.

FIG. 2 shows the mirror 120, mirror-frame 115, and connecting-rod 125 are as shown in FIG. 1. First cuff end 175 and second cuff end 180 are shown unconnected in FIG. 2, so that the cuff can be attached to the body-segment. When the cuff encircles the body-segment and the ends are secured to one another by hook-and-loop closure device mating members 200A and 200B, the invention is securely attached to the user's body-segment. Other useful closure mechanisms include hooks, buttons, zippers and snaps.

The cuff 160 comprises two parts: 1) an inner member and 2) a cover. FIG. 3 shows the inner member 300 in isolation. The inner member is a rigid, flexible plastic insert molded in the shape of a "C" so that it can be slipped onto the user's body-segment, like a bracelet. Attachment-device ball 155 is integrated with the inner member during molding using techniques that will be obvious to artisans of ordinary skill in the field of plastics molding. In other embodiments, a socket may be integrated with the inner member. In either case, the inner member is in direct communication with and engages the lower connecting member. Thus, the inner member acts to support the entire structure of the device when the cuff is attached to the body-segment.

FIG. 4 shows the relationship between the inner member and the cover. In this figure cuff 160 has been sectioned perpendicularly to its flat surface to show inner member 300 surrounded by cover 700, which encases the inner member except for where attachment-device ball 155 protrudes through the cover to engage the lower dual-socket connector. The cover has two ends, one of which forms flap 175 of the cuff to which is sewn one part of a pair of mating hook-and-loop closure members 200 shown in FIG. 2. The cover is made of cloth or other suitably flexible material. Cloth is particularly preferred for embodiments of the invention used in hunting because it can be colored with camouflage colors and designs. When the ends of the cuff are attached by the closure means, inner member 300 is held firmly against the body-segment, thereby providing support for the connecting mechanism and mirror assembly.

An alternative to using a cuff as an attachment-device is the use of elastic sleeve that is pulled into position by sliding it onto the user's body-segment. Such a sleeve device is also amenable to the inner member support-mechanism described above.

C. STRUCTURE OF THE INVENTION—SECOND PREFERRED EMBODIMENT

FIG. 5 shows a second preferred embodiment of the invention attached to the left upper arm of a user 500. The attachment-device of this embodiment is the same as that described above. For instance, it comprises an attachment-cuff 160 with a hook-and-loop closure mechanism and an attachment-device ball 155 depending from the inner member (not shown) of the attachment-cuff.

This second preferred embodiment represents the use of simple ball-and-socket-joint as adjustable articulations. The connecting-rod 505 comprises an upper ball-end 510 and a lower socket 515. The upper ball-end frictionally engages mirror-socket 520 that is structurally integrated with the mirror-frame 525. The lower socket 515 frictionally engages the attachment-ball device 155.

It will be appreciated from FIG. 5 that various combinations of different types of adjustable articulations may be employed. For instance, hinges, simple ball-and-socket joints, and compound ball-and-socket joints may be combined in different ways as upper and lower adjustable articulations to achieve the objects of the invention.

Connecting-rod 505 has two concentric sections of diminishing diameter such that the first concentric section 530 fits snugly within the second concentric section 535, thus providing a telescoping mechanism that allows the device to be extended (deployed state) or retracted (stored state). A threaded collar 540 is provided as is commonly found in telescoping rods. This collar, when tightened, increases the frictional force of the second concentric section upon the first concentric section, thereby securing them relative to one another. Such telescoping devices are common and, given the disclosures made herein, it will be obvious to an artisan of ordinary skill how to make and use the telescoping connecting-rod of the present invention.

D. OPERATION OF THE INVENTION

FIG. 6 represents a front view of a user 600 using the invention. The body-segment to which the invention is attached is the left upper arm. The embodiment of the invention being used in FIG. 6 employs a rectangular mirror-assembly 620. An upper simple ball-and-socket joint 605 serves as an upper adjustable articulation between the upper end of connecting-rod 615 and the mirror-assembly 620. A lower simple ball-and-socket joint 610 serves as an adjustable lower articulation between the lower end of connecting-rod 615 end and attachment-device 625.

FIG. 6 indicates how the mirror is raised into position and lowered into its storage state. To store the device the user merely rotates the mirror-assembly 90 degrees about the upper ball-and-socket joint 605 while simultaneously rotating the connecting-rod 615 downward about the lower ball-and-socket joint 610 until the mirror-assembly is adjacent the body-segment, with the mirror facing the body-segment for maximal protection. Retaining strap 630 is put into position over the connecting-rod and secured with hook-and-loop fastening members or snaps (not shown). To deploy the invention, the retaining band is released, the mirror-assembly is lifted into position and adjusted by rotating it about the upper adjustable connector so as to enlarge the field of view in the direction required.

3. CONCLUSIONS, RAMIFICATIONS, AND SCOPE

The foregoing description of the invention has emphasized its use as a hunting aid; however, the scope of the invention is much wider than that. The invention may be applied to any situation ir which a person desires to carry out surveillance of an area that is not directly in front of the person; i.e., areas directly to the rear or off to the side. The metes and bounds of the invention are to be ascertained by referring to the claims taken in conjunction with the foregoing disclosures.

I claim:

1. A portable mirror device for extending the field of view of a user to the rear and sides, said portable mirror device comprising:
   (a) a mirror assembly comprising at least one mirror;
   (b) a connecting member having an upper end and a lower end;
   (c) an upper adjustable articulation means for connecting said upper end of said connecting member to said mirror assembly;
   (d) an attachment device for reversibly attaching said portable mirror device to an arm of the user;
   (e) a lower adjustable articulation means for connecting said lower end of said connecting member to said attachment device; and,
   (f) a retaining strap for securing said mirror assembly against the user's arm,
   wherein said mirror assembly is raised and lowered with respect to the user's arm by adjusting said upper adjustable articulation means and said lower adjustable articulation means.

2. A portable mirror device as claimed in claim 1 wherein said mirror assembly is rotatably connected to said upper end of said connecting member.

3. A portable mirror device as claimed in claim 1 wherein said attachment device is rotatably connected to said lower end of said connecting member.

4. A portable mirror device as claimed in claim 1 wherein said upper adjustable articulation means is a simple ball-and-socket joint.

5. A portable mirror device as claimed in claim 1 wherein said upper adjustable articulation means is a compound ball-and-socket joint.

6. A portable mirror device as claimed in claim 1 wherein said lower adjustable articulation means is a simple ball-and-socket joint.

7. A portable mirror device as claimed in claim 1 wherein said lower adjustable articulation means is a compound ball-and-socket joint.

8. A portable mirror device as claimed in claim 1 wherein said mirror is convex.

9. A portable mirror device as claimed in claim 1 wherein said connecting member is a connecting-rod.

10. A portable mirror device as claimed in claim 9 wherein said connecting-rod comprises a telescoping means for extending and retracting said mirror assembly.

11. A portable mirror device as claimed in claim 1 wherein said connecting member is a gooseneck.

12. A portable mirror device as claimed in claim 1 wherein said attachment device comprises an elastic sleeve that slides over the user's arm.

13. A portable mirror device as claimed in claim 1 wherein said attachment device comprises a cuff that encircles the user's arm.

14. A portable mirror device as claimed in claim 14 wherein said cuff comprises:
   (a) a rigid inner member comprising means for engaging said lower adjustable articulation means;
   (b) a cover enclosing said inner member, said cover having a first end, a second end, and an opening through which said means for engaging said lower adjustable articulation means protrudes; and
   (c) a closure device for connecting said first end to said second end when said cuff encircles the user's arm, whereby the inner member is held firmly against the user's arm.

15. A portable mirror device as claimed in claim 15, wherein said closure device is chosen from the group consisting of: hook-and-loop means, button means, snap means, zipper means, and hook means.

16. A portable mirror device for extending the field of view of a user, said portable mirror device comprising:
   (a) a mirror assembly comprising at least one mirror;
   (b) a connecting member having an upper end and a lower end;
   (c) an upper connection means for connecting said upper end of said connecting member to said mirror assembly;
   (d) a cuff means for attaching said portable mirror device to a body-segment of the user wherein said cuff comprises:
      (i) a rigid inner member comprising means for engaging said lower connection means;
      (ii) a cover enclosing said inner member, said cover having a first end, a second end, and an opening through which said means for engaging said lower connection means protrudes; and
      (iii) a closure device for connecting said first end to said second end when said cuff encircles the body-segment, whereby the inner member is held firmly against the body-segment; and
   (e) a lower connection means for connecting said lower end of said connecting member to said attachment device.

17. A portable mirror device as claimed in claim 16, wherein said closure device is chosen from the group consisting of: hook-and-loop means, button means, snap means, zipper means, and hook means.

* * * * *